United States Patent
Bernat et al.

(10) Patent No.: US 10,929,231 B1
(45) Date of Patent: *Feb. 23, 2021

(54) SYSTEM CONFIGURATION SELECTION IN A STORAGE SYSTEM

(71) Applicant: PURE STORAGE, INC., Mountain View, CA (US)

(72) Inventors: Andrew Bernat, Mountain View, CA (US); Timothy Brennan, San Francisco, CA (US); Jimmy Chi-Wai Chui, San Francisco, CA (US); Alan Driscoll, Fremont, CA (US); Grigori Inozemtsev, San Jose, CA (US); Benjamin Scholbrock, Sunnyvale, CA (US); Neil Vachharajani, Menlo Park, CA (US)

(73) Assignee: Pure Storage, Inc., Mountain View, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/967,431

(22) Filed: Apr. 30, 2018

Related U.S. Application Data

(63) Continuation of application No. 14/927,977, filed on Oct. 30, 2015, now Pat. No. 10,353,777.

(51) Int. Cl.
  *G06F 11/14* (2006.01)
  *G06F 3/06* (2006.01)
(52) U.S. Cl.
  CPC ........ *G06F 11/1415* (2013.01); *G06F 3/0629* (2013.01)

(58) Field of Classification Search
  CPC ............. G06F 11/1076; G06F 11/1415; G06F 11/1417; G06F 11/1433; G06F 11/2094;
  (Continued)

(56) References Cited

U.S. PATENT DOCUMENTS

| 5,706,210 A | 1/1998 | Kumano et al. |
| 5,799,200 A | 8/1998 | Brant et al. |

(Continued)

FOREIGN PATENT DOCUMENTS

| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Gabriel Chu

(57) ABSTRACT

Ensuring crash-safe forward progress of a system configuration update in a storage system that includes a storage array controller and a plurality of storage devices, including: determining a number of storage devices in the storage system; determining a number of unavailable storage devices in the storage system; and determining, for the one or more system configurations, whether the system configuration can be reconstructed in dependence upon the number of storage devices in the storage system and the number of unavailable storage devices in the storage system.

19 Claims, 5 Drawing Sheets

(58) Field of Classification Search
CPC .. G06F 11/2289; G06F 3/0607; G06F 3/0629; G06F 3/0632; G06F 3/0689; G06F 9/4411; G06F 9/44505
See application file for complete search history.

(56) References Cited

U.S. PATENT DOCUMENTS

| | | |
|---|---|---|
| 5,835,694 A | 11/1998 | Hodges |
| 5,933,598 A | 8/1999 | Scales et al. |
| 6,012,032 A | 1/2000 | Donovan et al. |
| 6,085,333 A | 7/2000 | DeKoning et al. |
| 6,484,235 B1 | 11/2002 | Horst et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,680,957 B1 | 3/2010 | Ketterhagen et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,140,475 B1 | 3/2012 | Sparks |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,818,951 B1 | 8/2014 | Muntz et al. |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 2002/0013802 A1 | 1/2002 | Mori et al. |
| 2003/0145172 A1 | 7/2003 | Galbraith et al. |
| 2003/0188097 A1 | 10/2003 | Holland et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0148459 A1* | 7/2004 | Ali ..................... G06F 3/0632 711/114 |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0050381 A1 | 3/2005 | Maddock |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015767 A1 | 1/2006 | Sun Hsu et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0275921 A1 | 11/2008 | Gunabalasubramaniam et al. |
| 2008/0282045 A1 | 11/2008 | Biswas et al. |
| 2009/0012966 A1 | 1/2009 | Arai et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0019685 A1* | 1/2014 | Ling ..................... G06F 3/0664 711/114 |
| 2014/0020083 A1 | 1/2014 | Fetik |
| 2014/0074850 A1 | 3/2014 | Noel et al. |
| 2014/0075116 A1* | 3/2014 | Takahashi ............. G06F 3/0619 711/114 |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |

(56) References Cited

U.S. PATENT DOCUMENTS

| | | |
|---|---|---|
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0123926 A1 | 5/2017 | Bernat et al. |

FOREIGN PATENT DOCUMENTS

| | | | |
|---|---|---|---|
| WO | WO-2013071087 | A1 | 5/2013 |
| WO | WO-2014/110137 | A1 | 7/2014 |
| WO | WO-2016/015008 | A1 | 12/2016 |
| WO | WO-2016/190938 | A1 | 12/2016 |
| WO | WO-2016/195759 | A1 | 12/2016 |
| WO | WO-2016/195958 | A1 | 12/2016 |
| WO | WO-2016/195961 | A1 | 12/2016 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA. DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-38, IEEE Computer Society, USA, DOI: 10.1109/EDOC.2011.26, ISBN: 978-1-4577-0362-1.

Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

Patterson et al., *A Case for Redundant Arrays of Inexpensive Disks (RAID)*, Newsletter, ACM SIGMOD Record, vol. 17, No. 3, Jun. 1988, pp. 109-116, ACM New York, NY, USA.

International Search Report and Written Opinion, PCT/US2016/058988, dated Jan. 31, 2017, 11 pages.

Wikipedia, *Standard RAID Levels*, 2012, Retrieved Aug. 20, 2018, 7 pages, https://en.wikipedia.org/w/index.php?title=Standart_RAID_levels&oldid=527689482#RAID_6>.

* cited by examiner

SYSTEM CONFIGURATION SELECTION IN A STORAGE SYSTEM

CROSS-REFERENCE TO RELATED APPLICATION

This application is a continuation application of and claims priority from U.S. patent application Ser. No. 14/927,977, filed on Oct. 30, 2015.

BACKGROUND OF THE INVENTION

Field of the Invention

The field of the invention is data processing, or, more specifically, methods, apparatus, and products for ensuring crash-safe forward progress of a system configuration update.

Description of Related Art

Modern storage systems can include a variety of different components such as hard drives, solid-state drives, controllers, and so on. The different components that are included in the storage system may be described in a system configuration file that identifies all of the components in the storage system. Such a system configuration file may be fragmented into multiples portions for a variety of reasons, including to provide for increased resiliency, to provide for increased space efficiency, and so on. In such an example, each unique portion of the configuration file may be stored on a different storage device in the storage system. As components are added to or remove from the storage system, the system configuration file must be updated to accurately reflect the new state of the storage system. When the configuration file is fragmented into multiples portions that are each stored on a different storage device, updating the system configuration file must be accomplished by writing the updated information to each of the storage devices that store a portion of the system configuration file. If each portion of the updated system configuration file is not successfully written to each of the storage devices that store a portion of the system configuration file, however, conflicting versions of the system configuration file may exist.

SUMMARY OF THE INVENTION

Methods, apparatuses, and products for ensuring crash-safe forward progress of a system configuration update in a storage system that includes a storage array controller and a plurality of storage devices, including: determining a number of storage devices in the storage system; determining a number of unavailable storage devices in the storage system; and determining, for the one or more system configurations, whether the system configuration can be reconstructed in dependence upon the number of storage devices in the storage system and the number of unavailable storage devices in the storage system.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
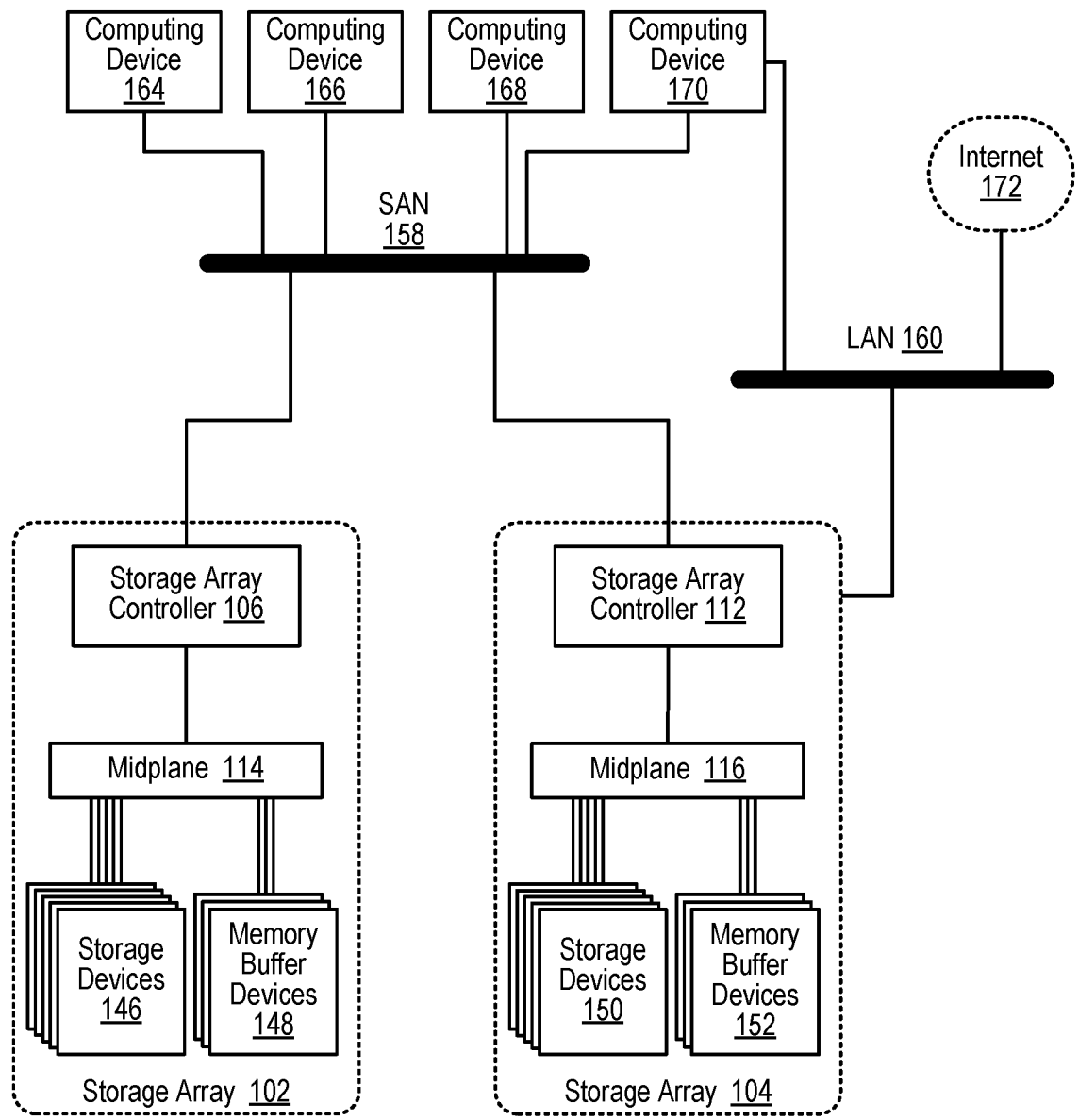
FIG. 1 sets forth a block diagram of a system in which crash-safe forward progress of a system configuration update is ensured according to embodiments of the present disclosure.

Example methods, apparatus, and products for ensuring crash-safe forward progress of a system configuration update in accordance with the present disclosure are described with reference to the accompanying drawings, beginning with FIG. 1. FIG. 1 sets forth a block diagram of a system in which crash-safe forward progress of a system configuration update is ensured according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols.

Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). The example storage arrays (102, 104) of FIG. 1 may provide persistent data storage for the computing devices (164, 166, 168, 170), at least in part, through the use of a plurality of storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114) to a number of storage devices (146, 150). Readers will appreciate that although the example depicted in FIG. 1 includes an embodiment where the storage array controller (106, 112) is communicatively coupled the storage devices (146, 150) via a midplane (114), other forms of interconnects may be utilized to facilitate communications between the storage array controller (106, 112) and the storage devices (146, 150). The storage array controllers (106, 112) of FIG. 1 may be configured for ensuring crash-safe forward progress of a system configuration update by determining a number of storage devices in the storage system, determining a number of unavailable storage devices in the storage system, and determining, for the one or more system configurations, whether the system configuration can be reconstructed in dependence upon the number of storage devices in the storage system and the number of unavailable storage devices in the storage system, as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Ensuring crash-safe forward progress of a system configuration update in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in ensuring crash-safe forward progress of a system configuration update according to embodiments of the present disclosure.

Figure 2:
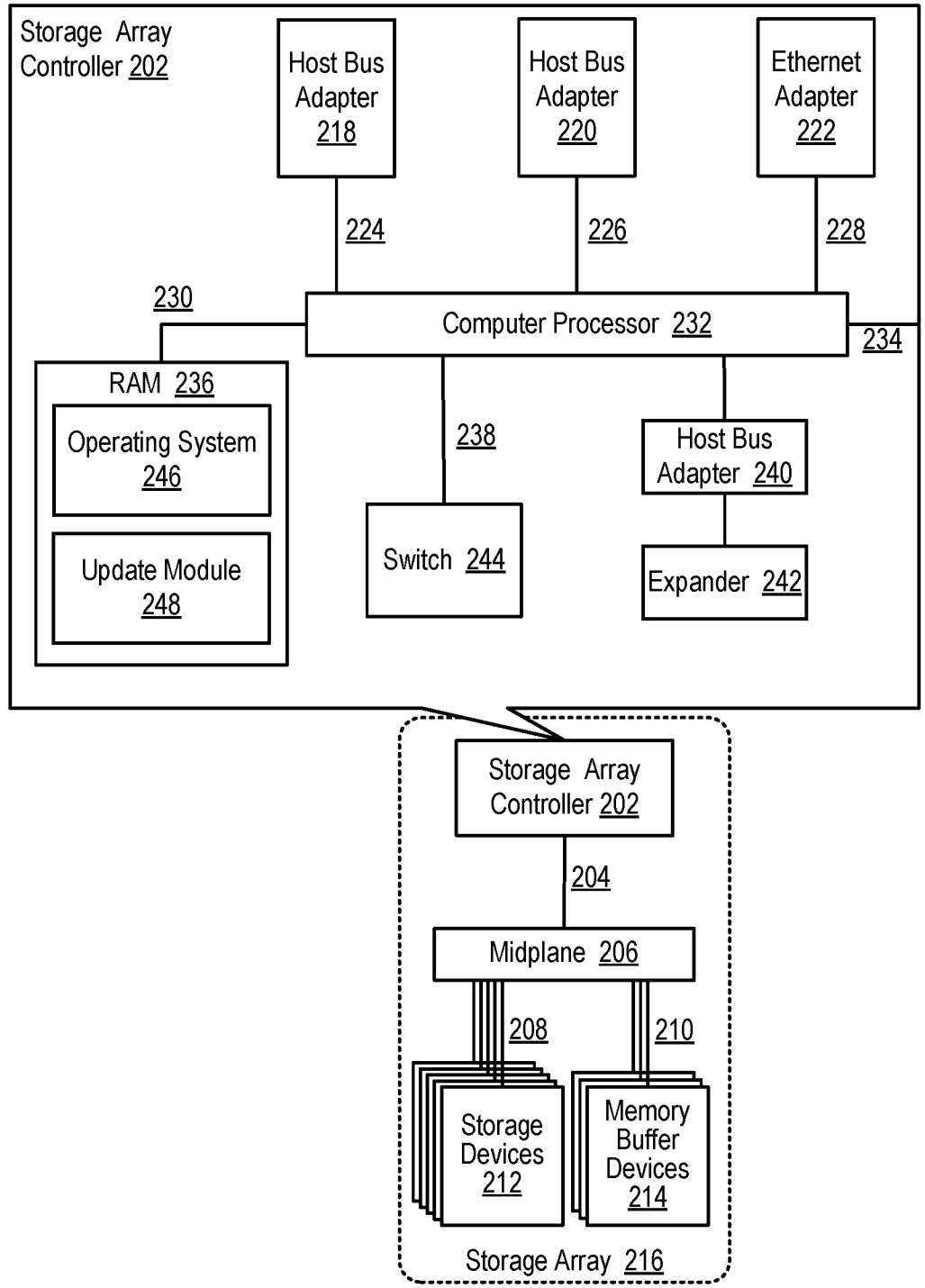
FIG. 2 sets forth a block diagram of a storage array controller useful in ensuring crash-safe forward progress of a system configuration update according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory (RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for ensuring crash-safe forward progress of a system configuration update according to embodiments of the present disclosure include UNIX™, Linux™, Microsoft Windows™, and others as will occur to those of skill in the art. Also stored in RAM (236) is an update module (248), a module that includes computer program instructions useful in ensuring crash-safe forward progress of a system configuration update according to embodiments of the present disclosure. The update module (248) may be configured to ensure crash-safe forward progress of a system configuration update by determining a number of storage devices in the storage system, determining a number of unavailable storage devices in the storage system, and determining, for the one or more system configurations, whether the system configuration can be reconstructed in dependence upon the number of storage devices in the storage system and the number of unavailable storage devices in the storage system, as will be described in greater detail below. Readers will appreciate that while the update module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
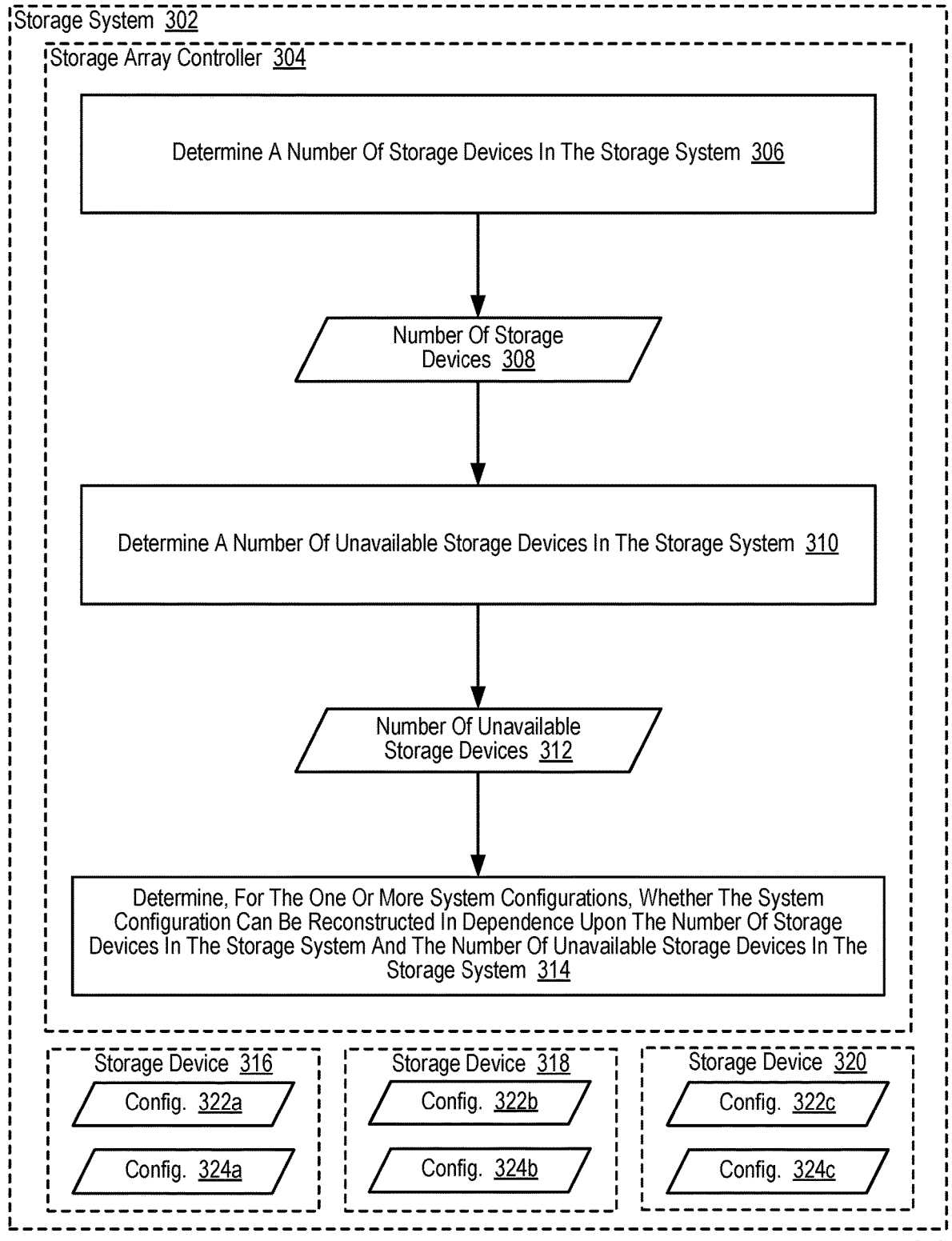
FIG. 3 sets forth a flow chart illustrating an example method for ensuring crash-safe forward progress of a system configuration update in a storage system according to embodiments of the present disclosure.

For further explanation, FIG. 3 sets forth a flow chart illustrating an example method for ensuring crash-safe forward progress of a system configuration update in a storage system (302) according to embodiments of the present disclosure. The storage system (302) of FIG. 3 may be similar to the storage systems described above with reference to FIG. 1, as the storage system (302) may include a storage array controller (304) and a plurality of storage devices (316, 318, 320). The storage array controller (304) and the plurality of storage devices (316, 318, 320) may be similar to the storage array controllers and storage devices described above with reference to FIG. 1 and FIG. 2. Although the example storage system (302) depicted in FIG. 3 includes only a single storage array controller (304), readers will appreciate that the storage system (302) may include additional storage array controllers that are not explicitly depicted in FIG. 3.

A system configuration can include information describing the storage system (302) and may be embodied, for example, as a data structure such as a file. The system configuration can include information such as an identification of the storage devices (316, 318, 320) that are included in the storage system (302), an identification of the storage devices (316, 318, 320) that are included in a logical grouping of storage devices (e.g., a write group), and so on. The system configuration may be stored by each of the storage devices (316, 318, 320) such that the storage array controller (304) may be stateless in the sense that the storage array controller (304) is not required to retain the system configuration.

In the example method depicted in FIG. 3, each of the storage devices (316, 318, 320) is depicted as storing a portion of two system configurations. For example, a first storage device (316) stores a first portion of a system configuration (322a), a second storage device (318) stores a second portion of the system configuration (322b), and a third storage device (320) stores a third portion of the system configuration (322c). In addition, the first storage device (316) stores a first portion of an additional system configuration (324a), the second storage device (318) stores a second portion of the additional system configuration (324b), and the third storage device (320) stores a third portion of the additional system configuration (324c). Readers will appreciate that according to embodiments of the present disclosure, each of the storage devices (316, 318, 320) may store portions of the system configuration, each of the storage devices (316, 318, 320) may store the entire system configuration, a subset of the storage devices (316, 318, 320) may store portions of the system configuration, a subset of the storage devices (316, 318, 320) may store the entire system configuration, and so on.

Readers will further appreciate that as storage devices are added to or removed from the storage system (302), the system configuration may be updated to reflect such changes. Updating the system configuration may be carried out, for example, by writing a new system configuration to each of the storage devices (316, 318, 320). To reduce the amount of storage required to store the system configurations, writing a new system configuration to the storage devices (316, 318, 320) may be carried out by overwriting an old system configuration stored on the storage devices (316, 318, 320), by deleting an old system configuration from the storage devices (316, 318, 320) before or after writing the new system configuration to the storage devices (316, 318, 320), and so on.

The example method depicted in FIG. 3 includes determining (306) a number (308) of storage devices in the storage system (302). The number (308) of storage devices in the storage system (302) represents all storage devices, whether currently available or currently unavailable, that are used for storing data in the storage system (302). The number (308) of storage devices in the storage system (302) may be determined (306), for example, by the storage array controller (304) accessing system inventory information. In such an example, system inventory information may be maintained by requiring that each storage device (316, 318, 320) that is inserted into the storage system (302) be registered with the storage array controller (304), by requiring that each storage device (316, 318, 320) that is removed from the storage system (302) be unregistered with the storage array controller (304), and so on. In such an example, registering and unregistering the storage devices (316, 318, 320) may be carried out by the storage array controller (304) implementing a detection mechanism, by the storage array controller (304) receiving one or more messages from the storage devices (316, 318, 320), or in other ways.

Although the example described above relates to an embodiment where the storage array controller (304) carries out functions to assist in maintaining system inventory information, readers will appreciate that in other embodiments system inventory information may be maintained by another entity. In such an example, the system inventory information may be made available to the storage array controller (304) through direct or indirect communications between the storage array controller (304) and the entity that maintains system inventory information. Determining (306) the number (308) of storage devices in the storage system (302) may therefore be carried out in such an embodiment through direct or indirect communications between the storage array controller (304) and the entity that maintains system inventory information.

The example method depicted in FIG. 3 also includes determining (310) a number (312) of unavailable storage devices in the storage system (302). The number (312) of unavailable storage devices in the storage system (302) represents the number of storage devices (316, 318, 320) that are still part of the storage system (302) but are currently unreachable by the storage array controller (304) in the sense that the storage array controller (304) is not able to determine the contents of the storage device. A storage device (316, 318, 320) may be unavailable, for example, because the storage device (316, 318, 320) is currently being booted, because the storage device (316, 318, 320) is powered down, because a communications channel between the storage array controller (304) and the storage device (316, 318, 320) is inoperable, and for other reasons. In such an example, because the storage array controller (304) is not able to determine the contents of the storage device (316, 318, 320), the storage array controller (304) will be unable to determine whether some particular system configuration information has been successfully written to the unavailable storage device. That is, the storage device (316, 318, 320) may contain the particular system configuration information or the storage device (316, 318, 320) may not contain the particular system configuration information, but the storage array controller (304) has no way of determining whether the unavailable storage device actually contains the particular system configuration information.

The example method depicted in FIG. 3 also includes determining (314), for the one or more system configurations, whether the system configuration can be reconstructed in dependence upon the number (308) of storage devices in the storage system (302) and the number (312) of unavailable storage devices in the storage system (302). Readers will appreciate that in embodiments where each device only stores a portion of a system configuration, the entire system configuration may be reconstructed even if all of the storage devices that are intended to store a distinct portion of the system configuration are not available. In such an example, the entire system configuration may be reconstructed through the use of redundant storage devices. The redundant storage devices may contain parity data or other data that can used to reconstruct data on a failed storage device. As such, so long as the number (312) of unavailable storage devices in the storage system (302) does not exceed a predetermined threshold that is based on the amount of storage devices that are used as redundant storage devices, the system configuration can be reconstructed.

Consider an example in which a storage system includes twelve storage devices that are utilized for storing data (including portions of the system configuration), as well as additional storage devices that are used as redundant storage devices, such that the storage system can tolerate the failure of two storage devices and still reconstruct all data (including portions of the system configuration) stored on the twelve storage devices. In such an example, so long as portions of the system configuration are stored on ten of the storage devices, the system configuration can be reconstructed. In such an example, determining (314) whether a particular system configuration can be reconstructed in dependence upon the number (308) of storage devices in the storage system (302) and the number (312) of unavailable storage devices in the storage system (302) may be carried out, for example, by assuming that each available storage device has stored a portion of the system configuration and determining whether the number (312) of unavailable storage devices in the storage system (302) exceeds the number of failures tolerated by the storage system (302).

Readers will appreciate that because some storage devices may be utilized exclusively for storing parity data, determining (306) the number (308) of storage devices in the storage system (302) and determining (310) the number (312) of unavailable storage devices in the storage system (302) may be carried out by excluding the storage devices that are utilized exclusively for storing parity data. That is, the storage devices that are utilized exclusively for storing parity data may be viewed as resources dedicated to maintaining the integrity of the storage system (302) rather than viewed as storage resources of the storage system (302) itself. Likewise, in an embodiment where storage devices are used to store parity data and non-parity data (e.g., a storage system that implements policies similar to RAID 5 and RAID 6), determining (314) whether a particular system configuration can be reconstructed in dependence upon the number (308) of storage devices in the storage system (302) and the number (312) of unavailable storage devices in the storage system (302) may be carried out by excluding storage devices that include only parity data for the particular system configuration from inclusion in the number (308) of storage devices in the storage system (302) and the number (312) of unavailable storage devices in the storage system (302).

Figure 4:
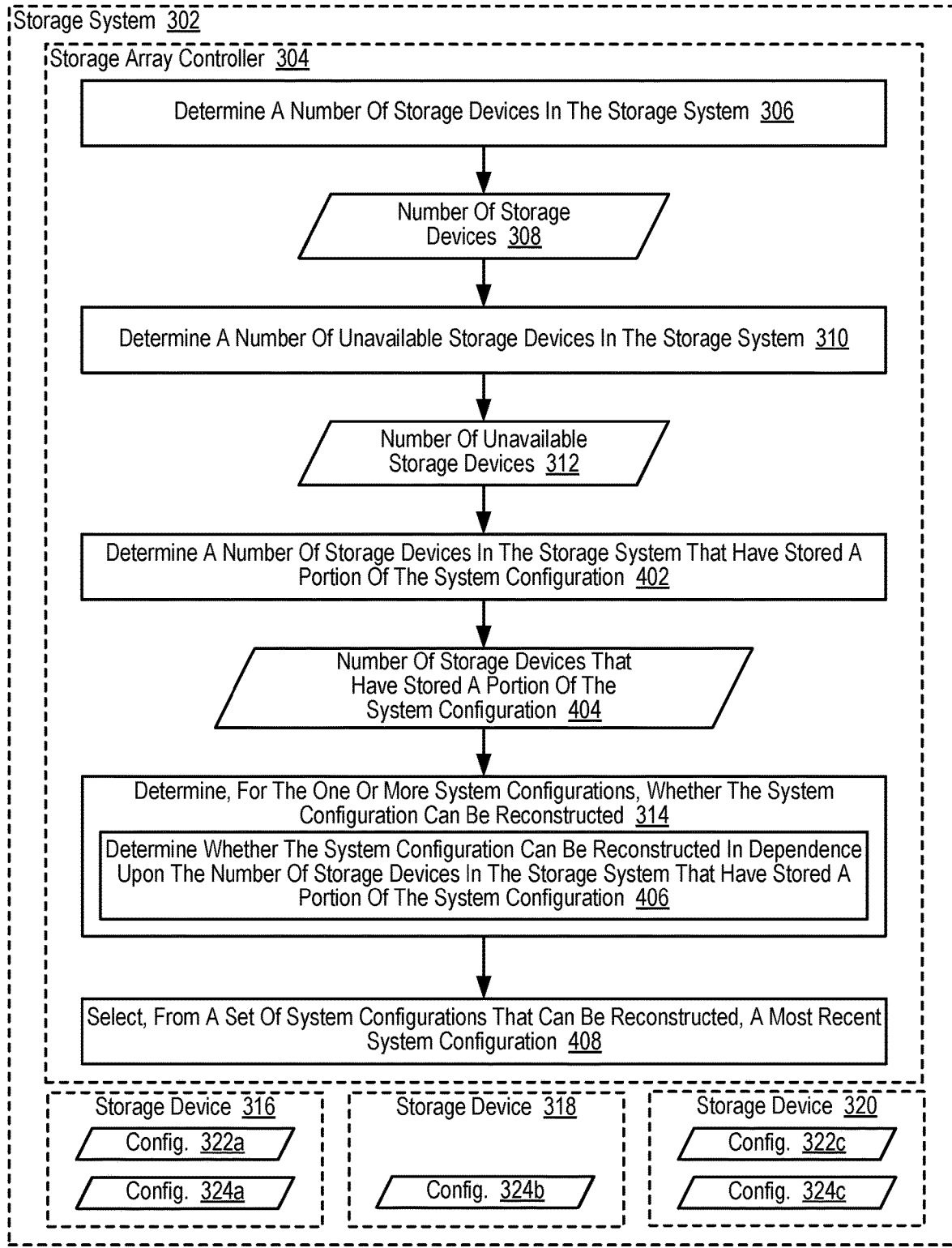
FIG. 4 sets forth a flow chart illustrating an additional example method for ensuring crash-safe forward progress of a system configuration update in a storage system according to embodiments of the present disclosure.

For further explanation, FIG. 4 sets forth a flow chart illustrating an additional example method for ensuring crash-safe forward progress of a system configuration update in a storage system (302) that includes a storage array controller (304) and a plurality of storage devices (316, 318, 320) according to embodiments of the present disclosure. The example method depicted in FIG. 4 is similar to the example method depicted in FIG. 3, as the example method depicted in FIG. 4 also includes determining (306) a number (308) of storage devices in the storage system (302), determining (310) a number (312) of unavailable storage devices in the storage system (302), and determining (314), for the one or more system configurations, whether the system configuration can be reconstructed.

The example method depicted in FIG. 4 also includes determining (402), for one or more system configurations, a number (404) of storage devices in the storage system that have stored a portion of the system configuration. Determining (402) the number (404) of storage devices in the storage system that have stored a portion of the system configuration may be carried out, for example, by inspecting a portion of the storage device (316, 318, 320) that is used to store portions of a system configuration. The portion of the storage device (316, 318, 320) that is used to store portions of a system configuration may be embodied, for example, as a predetermined address range in each storage device (316, 318, 320) that is reserved for storing system configurations.

In the example method depicted in FIG. 4, a first storage device (316) stores a first portion of a first system configuration (322a) and a third storage device (320) stores a third portion of the first system configuration (322c). In the example method depicted in FIG. 4, however, the second storage device (318) has not stored a second portion of the first system configuration. As such, the number (404) of storage devices that have stored a portion of the first system configuration is equal to two. In contrast, the first storage device (316) stores a first portion of a second system configuration (324a), the second storage device (318) stores a second portion of the second system configuration (324b), and the third storage device (320) stores a third portion of the second system configuration (324c). As such, the number (404) of storage devices that have stored a portion of the second system configuration is equal to three.

Readers will appreciate that in the example method depicted in FIG. 4, the number (308) of storage devices in the storage system (302) can be greater than the number (404) of storage devices that have stored the system configuration. The number (308) of storage devices in the storage system (302) can be greater than the number (404) of storage devices that have stored the system configuration, for example, because a particular storage device was offline when a system configuration was broadcast to the devices, because an error occurred when a particular storage device attempted to write the system configuration to memory, or for a variety of other reasons.

In the example method depicted in FIG. 4, determining (314) whether the system configuration can be reconstructed can include determining (406) whether the system configuration can be reconstructed in dependence upon the number (404) of storage devices in the storage system that have stored a portion of the system configuration. Determining (406) whether the system configuration can be reconstructed in dependence upon the number (404) of storage devices in the storage system that have stored a portion of the system configuration may be carried out, for example, by determining whether the number (404) of storage devices in the storage system that have stored a portion of the system configuration meets or exceeds the number of storage devices required to have stored a portion of the system configuration in order for the system configuration to be reconstructed using redundancy resources. For example, if the number (404) of storage devices that have stored a portion of the system configuration meets or exceeds the number of storage devices required to have stored a portion of the system configuration in order for the system configuration to be reconstructed using redundancy resources (e.g., storage devices that include parity data), the storage array controller (304) can affirmatively determine that the system configuration can be reconstructed. Alternatively, if the number (404) of storage devices that have stored a portion of the system configuration is less than the number of storage devices required to have stored a portion of the system configuration in order for the system configuration to be reconstructed using redundancy resources (e.g., storage devices that include parity data), the storage array controller (304) can determine that the system configuration may not be reconstructed.

Readers will appreciate that the number of unavailable storage devices may render, at least temporarily, the storage array controller (304) unable to determine whether the system configuration will ultimately be able to be reconstructed. Consider the example described above in which in which a storage system includes twelve storage devices that are utilized for storing data (including portions of the system configuration), as well as additional storage devices that are used as redundant storage devices, such that the storage system can tolerate the failure of two storage devices and still reconstruct all data (including portions of the system configuration) stored on the twelve storage devices. As described above, so long as portions of the system configuration are stored on ten of the storage devices, the system configuration can be reconstructed.

In the example described above, assume that the storage array controller (304) definitively determines that nine storage devices do include a portion of a particular system configuration, such that the number (404) of storage devices in the storage system that have stored a portion of the system configuration is determined (402) as being nine. In addition, assume that the storage array controller (304) is unable to access two of the storage devices, such that the number (312) of unavailable storage devices in the storage system (302) was determined (310) as being two. In such an example, because it cannot be determined whether the two unavailable storage devices have stored a portion of the system configuration, the storage array controller (304) cannot definitively determine whether the system configuration can be reconstructed. That is, the storage array controller (304) cannot ensure that the system configuration will ultimately be able to be reconstructed, nor can the storage array controller (304) definitively exclude the possibility that the system configuration will ultimately be able to be reconstructed. If at some point in the future both unavailable storage devices become available and neither storage device has stored a portion of the system configuration, it will not be possible to reconstruct the system configuration. If at some point in the future, however, one or more of the unavailable storage devices becomes available and the storage array controller (304) confirms that the newly available storage device has stored a portion of the system configuration, it will be possible to reconstruct the system configuration.

The example method depicted in FIG. 4 also includes selecting (408), from a set of system configurations that can be reconstructed, a most recent system configuration. In the example method depicted in FIG. 4, each of the system configurations may include information such as a version number, date stamp, or other information used to identify which system configuration is the most recent system configuration. By selecting (408) the most recent system configuration from the set of system configurations that can be reconstructed, the storage array controller (304) can ensure that an outdated system configuration is not implemented, that portions of multiple system configurations are not implemented, and so on.

Figure 5:
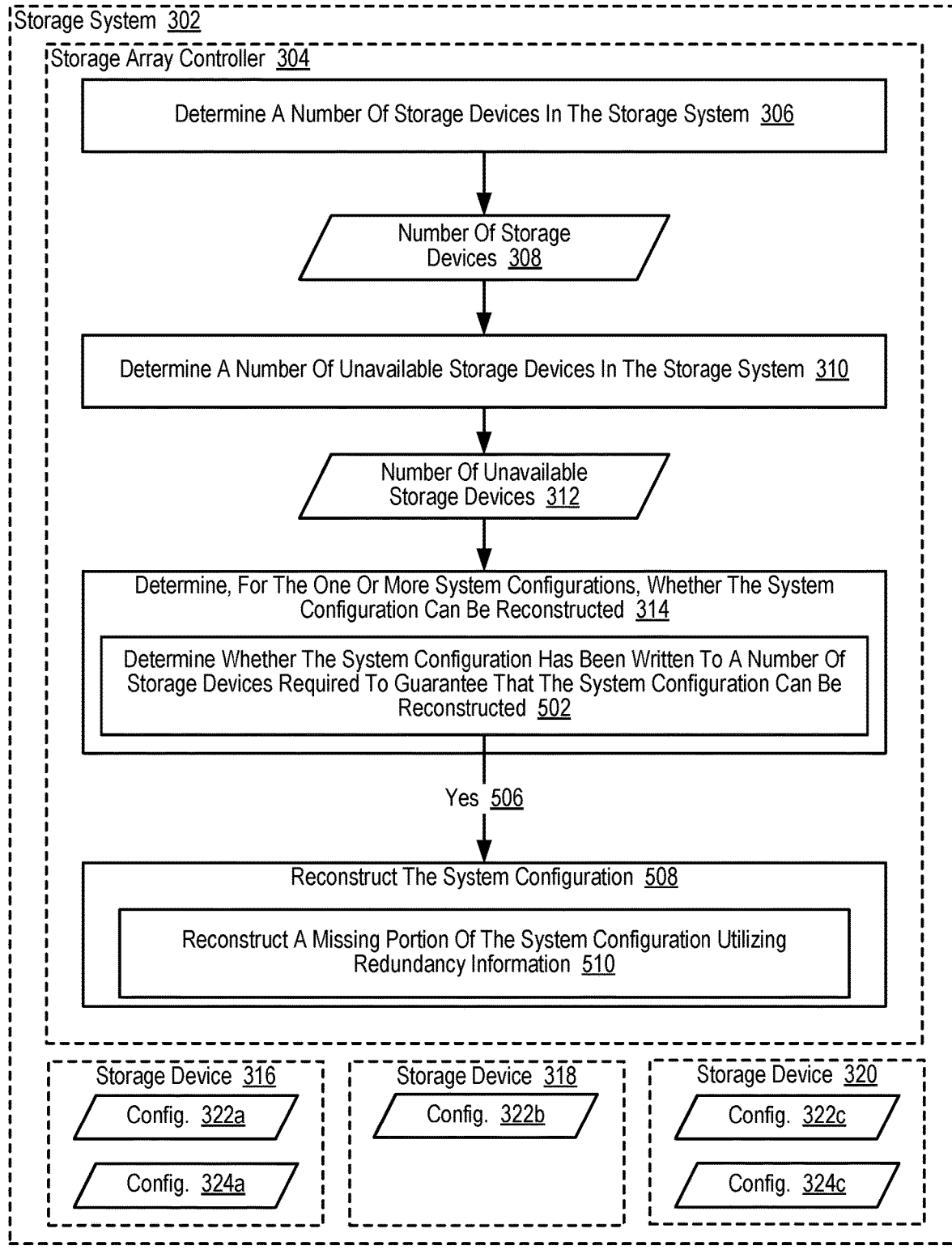
FIG. 5 sets forth a flow chart illustrating an additional example method for ensuring crash-safe forward progress of a system configuration update in a storage system according to embodiments of the present disclosure.

For further explanation, FIG. 5 sets forth a flow chart illustrating an additional example method for ensuring crash-safe forward progress of a system configuration update in a storage system (302) that includes a storage array controller (304) and a plurality of storage devices (316, 318, 320) according to embodiments of the present disclosure. The example method depicted in FIG. 5 is similar to the example method depicted in FIG. 3, as the example method depicted in FIG. 5 also includes determining (306) a number (308) of storage devices in the storage system (302), determining (310) a number (312) of unavailable storage devices in the storage system (302), and determining (314), for the one or more system configurations, whether the system configuration can be reconstructed.

In the example method depicted in FIG. 5, determining (314) whether the system configuration can be reconstructed can include determining (502) whether the system configuration has been written to a number of storage devices required to guarantee that the system configuration can be reconstructed. In the example method depicted in FIG. 5, even if each of the storage devices (316, 318,320) are intended to each store a distinct portion of the system configuration (322a, 322b, 322c), it may be possible to reconstruct the system configuration even if one or more of the storage devices (316, 318,320) do not actually store a distinct portion of the system configuration. The system configuration may be reconstructed even if one or more of the storage devices (316, 318, 320) do not actually store a distinct portion of the system configuration, for example, through the use of redundant storage devices that contain redundancy information that can be utilized to reconstruct missing data on one or more of the storage devices (316, 318, 320). In such an example, the amount of redundancy information retained in the storage system (302) may impact the number of storage devices required to guarantee that the system configuration can be reconstructed. For example, the number of storage devices required to guarantee that the system configuration can be reconstructed may be lower in a storage system that includes a large amount of redundancy resources relative to the number of storage devices required to guarantee that the system configuration can be reconstructed in a storage system that includes a smaller amount of redundancy resources.

The example method depicted in FIG. 5 also includes, responsive to affirmatively (506) determining that the system configuration has been written to the number of storage devices required to guarantee that the system configuration can be reconstructed, reconstructing (508) the system configuration. Reconstructing (508) the system configuration may be carried out, for example, by reconstructing (510) a missing portion of the system configuration utilizing redundancy information. The redundancy information may be embodied, for example, as parity data that is stored on one or more redundant storage devices.

Consider the example method depicted in FIG. 5, where a first storage device (316) stores a first portion of a particular system configuration (324a) and a third storage device (320) stores a third portion of the particular system configuration (324c), but the second storage device (318) has not stored a portion of the particular system configuration. In such an example, through the use of redundancy information such as parity data, the first portion of the particular system configuration (324a), and the third portion of the particular system configuration (324c), the portion of the particular system configuration that should be stored on the second storage device (318) may be reconstructed (508). As such, the full system configuration may be generated by combining the first portion of the particular system configuration (324a), the reconstructed second portion of the particular system configuration, and the third portion of the particular system configuration (324c).

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

Although the examples described above describe embodiments where various actions are described as occurring within a certain order, no particular ordering of the steps are required. In fact, it will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
 responsive to detecting a failure to write each portion of a system configuration update to storage devices in a storage system, determining one or more system configurations that can be reconstructed in dependence upon a number of storage devices in the storage system and a number of unavailable storage devices in the storage system; and
 selecting, from the one or more of system configurations that can be reconstructed, a system configuration for accessing storage devices in the storage system, the system configuration comprising a most recent system configuration.

2. The method of claim 1, wherein determining the one or more system configurations that can be reconstructed further comprises:
 determining, for each system configuration of the one or more system configurations, a number of storage devices in the storage system that have stored a portion of a respective system configuration.

3. The method of claim 2 wherein the number of storage devices in the storage system is greater than the number of storage devices that have stored the system configuration.

4. The method of claim 2 wherein determining the one or more system configurations that can be reconstructed further comprises determining, for each system configuration of the one or more system configurations, that the respective system configuration can be reconstructed in dependence upon the number of storage devices in the storage system that have stored a portion of the respective system configuration.

5. The method of claim 1 wherein determining the one or more system configurations that can be reconstructed further comprises determining that the system configuration has been written to a number of storage devices required to guarantee that the system configuration can be reconstructed, the method further comprising:
responsive to determining that the system configuration has been written to the number of storage devices required to guarantee that the system configuration can be reconstructed, reconstructing the system configuration.

6. The method of claim 5 wherein reconstructing the system configuration further comprises reconstructing a missing portion of the system configuration utilizing redundancy information.

7. The method of claim 1, further comprising:
reconstructing the most recent system configuration using portions of the most recent system configuration stored separately on the storage devices in the storage system.

8. An apparatus comprising a computer processor, a computer memory operatively coupled to the computer processor, the computer memory having disposed within it computer program instructions that, when executed by the computer processor, cause the apparatus to carry out the steps of:
responsive to detecting a failure to write each portion of a system configuration update to storage devices in a storage system, determining one or more system configurations that can be reconstructed in dependence upon a number of storage devices in the storage system and a number of unavailable storage devices in the storage system; and
selecting, from the one or more of system configurations that can be reconstructed, a system configuration for accessing storage devices in the storage system, the system configuration comprising a most recent system configuration.

9. The apparatus of claim 8, wherein determining the one or more system configurations that can be reconstructed further comprises:
determining, for each system configuration of the one or more system configurations, a number of storage devices in the storage system that have stored a portion of a respective system configuration.

10. The apparatus of claim 9 wherein the number of storage devices in the storage system is greater than the number of storage devices that have stored the system configuration.

11. The apparatus of claim 9 wherein determining the one or more system configurations that can be reconstructed further comprises determining, for each system configuration of the one or more system configurations, that the respective system configuration can be reconstructed in dependence upon the number of storage devices in the storage system that have stored a portion of the respective system configuration.

12. The apparatus of claim 8 wherein determining the one or more system configurations that can be reconstructed further comprises determining that the system configuration has been written to a number of storage devices required to guarantee that the system configuration can be reconstructed, the apparatus further comprising computer program instructions that, when executed by the computer processor, cause the apparatus to carry out the step of:
responsive to determining that the system configuration has been written to the number of storage devices required to guarantee that the system configuration can be reconstructed, reconstructing the system configuration.

13. The apparatus of claim 12 wherein reconstructing the system configuration further comprises reconstructing a missing portion of the system configuration utilizing redundancy information.

14. A computer program product disposed upon a non-transitory computer readable medium, the computer program product comprising computer program instructions that, when executed, cause a computer to carry out:
responsive to detecting a failure to write each portion of a system configuration update to storage devices in a storage system, determining one or more system configurations that can be reconstructed in dependence upon a number of storage devices in the storage system and a number of unavailable storage devices in the storage system; and
selecting, from the one or more of system configurations that can be reconstructed, a system configuration for accessing storage devices in the storage system, the system configuration comprising a most recent system configuration.

15. The computer program product of claim 14, wherein determining the one or more system configurations that can be reconstructed further comprises:
determining, for each system configuration of the one or more system configurations, a number of storage devices in the storage system that have stored a portion of a respective system configuration.

16. The computer program product of claim 15 wherein the number of storage devices in the storage system is greater than the number of storage devices that have stored the system configuration.

17. The computer program product of claim 15 wherein determining the one or more system configurations that can be reconstructed further comprises determining, for each system configuration of the one or more system configurations, that the respective system configuration can be reconstructed in dependence upon the number of storage devices in the storage system that have stored a portion of the respective system configuration.

18. The computer program product of claim 14 wherein determining the one or more system configurations that can be reconstructed further comprises determining whether the system configuration has been written to a number of storage devices required to guarantee that the system configuration can be reconstructed, the computer program product further comprising computer program instructions that, when executed, cause the computer to carry out the step of:
responsive to determining that the system configuration has been written to the number of storage devices required to guarantee that the system configuration can be reconstructed, reconstructing the system configuration.

19. The computer program product of claim 18 wherein reconstructing the system configuration further comprises reconstructing a missing portion of the system configuration utilizing redundancy information.

* * * * *